Nov. 18, 1969     E. V. CARDINAL     3,479,154

METHOD FOR CHOLESTEROL DETERMINATION

Filed March 24, 1967

Inventor
Earl Victor Cardinal

By Basil E. Demeur
Attorney

United States Patent Office 3,479,154
Patented Nov. 18, 1969

3,479,154
METHOD FOR CHOLESTEROL DETERMINATION
Earl Victor Cardinal, Lake Bluff, Ill., assignor to Abbott Laboratories, North Chicago, Ill., a corporation of Illinois
Filed Mar. 24, 1967, Ser. No. 625,858
Int. Cl. G01n 33/00
U.S. Cl. 23—230        5 Claims

ABSTRACT OF THE DISCLOSURE

A simplified method for determining the amount of total cholesterol in a sample of serum, plasma or tissue comprising the steps of solvent extracting the cholesterol from the sample, adding to the solution so obtained to precipitate the cholesterol, a cholesterol-precipitant which has been labelled with a radioactive isotopic material, measuring the radiation level of the supernatant, and comparing this measurement against a standard curve of known cholesterol concentration versus counts per minute of the supernatant to ascertain the amount of cholesterol present in the sample.

BACKGROUND OF INVENTION

The accurate measurement of cholesterol in warm-blooded animals, such as for example human blood serum, is an important clinical tool. It is theorized that cholesterol is a likely precursor of many steroid hormones and plays a key role in the transport of neutral fats. For example, the adrenal gland, upon stimulation by adrenocorticotropic hormone, produces a number of steroidal hormones including corticosterone and cortisol, and it is believed that these two hormones are derived in vivo from cholesterol. From a clinical standpoint, elevated levels of cholesterol in the blood serum are usually considered to be symptomatic of disease, such as coronary artery disease for example. It is therefore apparent that the accurate measurement of tissue and body fluid cholesterol is a highly desirable clinical tool.

In the past, several methods of cholesterol determination have been developed most of which utilize the colorimetric reaction of the extracted cholesterol with a solution of acetic anhydride and sulfuric acid or ferric chloride and sulfuric acid. According to these methods, several known concentrations of cholesterol are color-set with the coloring solution and colorimetric readings taken of each. A standard curve is then constructed by plotting cholesterol concentration against colorimetric readings. An unknown cholesterol-containing sample may then be similarly reacted with the coloring solution, a colorimetric reading obtained and the corresponding cholesterol concentration may then be obtained from the standard curve. These colorimetric assays are complicated, however, because of reagent instability and sensitivity to light and temperature. Furthermore, these methods all require a variety of extraction and purification steps necessitating the serial transferring of reactants from one vessel to another and excessive manual handling resulting in the likely loss of some amounts of cholesterol and consequent erroneous measurements.

A more recent technique utilizes tritiated digitonin to precipitate the cholesterol from the cholesterol-containing extract solution as a cholesterol-digitonide complex, after which a radiation count is taken of the precipitate. This count is then compared to a standard curve, prepared by taking counts of various known concentrations of cholesterol precipitated with tritiated digitonin and plotting counts per minute against cholesterol concenrations, and the cholesterol concentration may then be read off of the standard curve. (M. D. Morris, Analytical Biochemistry, 11 pp., 402–410, 403.) This method, however, calls for precise quantitative precipitation and purification steps since, again, any loss of cholesterol during manipulation will result in erroneous measurements. For this reason, the technique is not suited for an ordinary laboratory technician having only average laboratory skill, as is usual in hospitals and clinics.

BRIEF SUMMARY OF INVENTION

The object of this invention is to provide a simplified and highly accurate method for determining the cholesterol content in tissue plasma or serum samples. According to this method, an acetone-alcohol solution is first used to precipitate the proteins and salts, and extract the cholesterol from the sample. Cholesterol is then precipitated from the extract solution with a known excess amount of an isotopic material. The remaining supernatant is assayed by scintillation counting or some other appropriate technique to determine the resulting radiation level of the supernatant. This reading is then compared to a standard curve, prepared by plotting known increasing concentrations of cholesterol each precipitated with constant amounts of the same isotopic material followed by the radio assay of the supernatant of each standard unit against counts per minute of the supernatant, to determine cholesterol concentration of the sample. This technique obviates the necessity of handling the cholesterol-containing precipitates and thereby provides an indirect but simplified and accurate measure of the cholesterol concentration.

BRIEF DESCRIPTION OF DRAWINGS

In order to better understand this invention, reference is made to the appended drawings wherein.

DETAILED DESCRIPTION

The method detailed herein may be employed for cholesterol determinations of tissue, plasma or serum samples. Of course, if a total chloesterol measurement is to be made, the process must include a saponification step in order to extract the esterified cholesterol. It is clear that this method is therefore suitable for measuring either free or esterified cholesterol individually, or for a total cholesterol determination.

Figure 1:
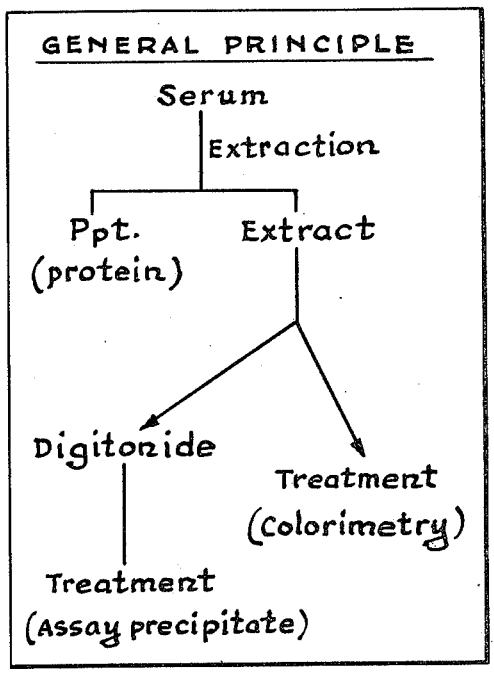
FIGURE 1 shows a schematic of the general steps involved in prior art methods.
Figure 2:
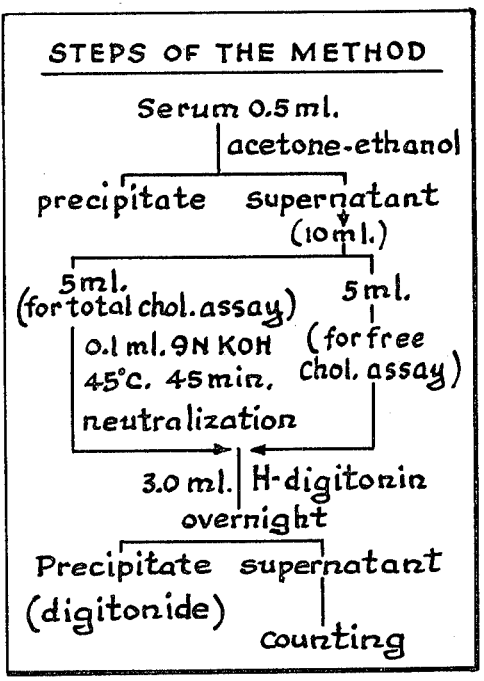
FIGURE 2 is a schematic diagram of the steps involved in the instant invention.

The first step of the method requires the extraction of cholesterol, both free and esterified, from the sample. Generally, an acetone-alcohol solution is used to separate the cholesterol from such impurities as proteins and salts; a solution of one part acetone to one part ethyl alcohol will accomplish the necessary separation. Addition of the acetone-alcohol solution precipitates the proteins and salts leaving the free and esterified cholesterol in the supernatant. The supernatant may be divided into two equal portions, one portion to be used for the free cholesterol assay and the other portion to be subjected to saponification for the esterified cholesterol assay. FIGURE 2 shows schematically an illustrative analysis where 10 ml. of the extract-containing supernatant is divided into two 5 ml. portions for subsequently conducting both assays. This double assay is only required, of course, where measurement of either esterified cholesterol or total cholesterol is desired.

The isotopic material utilized in the practice of this invention must consist of some labelled material suitable for precipitating cholesterol out of solution. Generally, it has been found that such substances as digitonin, tomatidine and tomatine are well suited for this purpose inasmuch as these will form an insoluble complex with cholesterol. In addition, these substances may be appropriately labelled with either tritium ($^3H$), $^{14}C$ or $^{131}I$. The cholesterol complexes so formed are macromolecules and therefore easily precipitate out of solution. In the preferred embodiment of this invention, a solution of digitonin labelled with tritium ($^3H$) is found to function efficiently as a complexing substance. A procedure for preparing tritiated digitonin is described in the examples following hereafter. The digitonin solution may consist of a combination of labelled and non-labelled digitonin in a ratio of one part tritiated digitonin to form about 12 to about 20 parts of non-labelled digitonin dissolved in an appropriate solvent such as ethyl alcohol. Non-labelled digitonin is added to the solution since the labelled digitonin has far more activity than is necessary for this procedure and diluting the labelled with non-labelled digitonin yields a solution with a safe radiation level while at the same time saving expense and accomplishing the desired end.

Although the radiation level of the supernatant may be measured in any suitable manner, it is preferred to perform the assay with a scintillator spectrometer. The scintillator material is composed of any suitable material or solution which is capable of responding to radiation by changing energy levels when exposed to radiation and emitting energy, usually in the form of light, when returning to its former energy level. The emitted light may be measured in a suitable manner, such as a spectrophotometer, thereby indirectly measuring the amount of radioactive material present in the sample tested. Suitable scintillator compositions are known in the art. In the practice of this invention, the following scintillator recipes have been found to function efficiently.

TABLE

| Ex. | Material | Amounts |
|---|---|---|
| (a) | Toluene (ml.) | 650 |
|  | Ethylene glycol monomethylether (ml.) | 350 |
|  | 2,5-diphenyloxazole (grams) | 8 |
| (b) | Toluene (ml.) | 750 |
|  | Methyl alcohol (ml.) | 250 |
|  | 2,5 diphenyloxazole (grams) | 3 |

If desired, a small amount of scintillator enhancing material, such as 1,4-bis-[2-(5-phenyloxazolyl)] benzene, may optionally be added to enhance the efficiency of the scintillator material. For scintillation counting, only relatively small amounts of the material being assayed need be used in proportion to the scintillator material. Hence, a ratio of about 1 part test sample to from about 50 to 80 parts scintillator will yield good results. For example, a test sample of 0.2 ml. when combined with 15 ml. of the scintillator material will yield an accurate radiation count of the sample material tested.

The practice of this novel method requires that a standard curve be constructed against which unknown samples may be compared. To this end, solutions of known increasing amounts of cholesterol in an acetone-alcohol solvent are made up and to each is added a constant known amount of the desired isotopic material. For ease of description, reference will be made to the use of tritiated digitonin although it is to be understood that the other previously mentioned labelled substances may similarly be utilized. The addition of tritiated digitonin form a cholesterol-digitonide complex which precipitates out of solution leaving a supernatant, which is then assayed by scintillation counting. This reading indicates the amount of tritiated digitonin remaining in the supernatant and therefore indirectly indicates the amount of cholesterol which has been precipitated out since the initial volume of tritiated digitonin is held constant for each cholesterol-containing solution. In effect, cholesterol content is being measured by the difference between the amount of tritiated digitonin originally added to the solution and the amount left in the supernatant after precipitation with cholesterol, as determined by the radiation activity of the tritiated digitonin before addition and after precipitation.

If desired, some of the known cholesterol solutions may be subjected to the saponification step before the labelled digitonin is added. Although the cholesterol is present in its free form in the standard solutions and there is nothing in the solution to be saponified, nevertheless, this may be done in order to simulate the precise conditions of actual samples which are saponified to release the esterified cholesterol. With the addition of the labeled digitonin, readings may then be taken of the supernatant, which also contains the hydrolysis solution, and incorporated into the standard curve to insure an accurate standard curve. However, it has been found that insofar as the standard is concerned, the presence of hydrolytic agents in no way affects the scintillation counting of the supernatant.

Example 1.—Preparation of tritiated digitonin solution

To 200 mg. of digitonin is added 5 ml. of dimethyl formamide and the mixture is stirred until the digitonin is dissolved. To this mixture is added 200 mg. of 30% palladium on carbon and a magnetic mixer bar is placed in the reaction flask.

The flask is attached to a vacuum line, frozen with liquid nitrogen and evacuated to 1–2 microns pressure. The flask is then warmed to room temperature and the catalyst is saturated with hydrogen while the mixture is stirred with the magnetic mixer. Excess hydrogen is removed by freezing the mixture with liquid nitrogen and opening the stopcock to the vacuum line.

Tritium gas is pumped into the frozen reaction mixture with a Toepler pump. Tritium is released from the supply bulb into the pump by dropping the magnet from the magnet storage chamber with the aid of another magnet. The line from the supply bulb to the pump is evacuated to about 1 micron pressure before the break seal in the tritium bulb is broken. About twelve strokes of the pump is sufficient to transfer all the tritium from the supply bulb to the reaction vessel.

The reaction mixture is adjusted to room temperature and hydrogen is admitted to adjust to atmospheric pressure. The reaction mixture is stirred with the magnetic mixer for about 48 hours, the rate of exchange of tritium for hydrogen determining the precise reaction time. The reaction mixture is frozen by immersion in a liquid nitrogen bath and the unused tritium and hydrogen gases are drawn out into the pump before removal of the reaction vessel from the vacuum line apparatus.

The reaction vessel is removed and allowed to come to room temperature. The catalyst mixture is separated by filtration and the filtrate containing the tritiated digitonin is transferred to a 500 ml. flask and 250 ml. of methyl alcohol is added. Labile tritium is removed with the alcohol by distillation of the alcohol in vacuo. The addition and distillation with alcohol is repeated until scintillation counting assays of the still pot become constant. The tritiated digitonin is then purified and ready for further use.

Example 2.—Construction of standard curve

Standard solutions of cholesterol in acetone-alcohol are made up comparable to cholesterol levels which might be found in human sera, that is, 100 mg. percent to 1000 mg. percent. From each solution of a given cholesterol level, a 1.25 ml. aliquot is removed and placed in a 10 ml. volumetric flask and 13 ml. of the acetone-alcohol solution is added.

Two 5 ml. aliquots of the cholesterol solution are drawn off. One aliquot portion is placed in a graduated centrifuge tube and 0.1 ml. of 9 N potassium hydroxide solution is added. The solution is mixed and heated to 45° C. for 45 minutes, then cooled to room temperature.

One drop of phenolphthalein solution is added and then 10% acetic acid is added dropwise until the solution is colorless and an additional drop of acid is then added.

Three ml. portions of tritiated digitonin solution is added to each of the 5 ml. aliquots; the volume is adjusted to 8 ml.; the solution mixed; and the cholesterol digitonide is allowed to crystallize overnight at room temperature.

Two-tenths ml. aliquots of each of the supernatants are each added to a 15 ml. portion of scintillator solution and the counts per minute of each supernatant are determined with a liquid scintillation spectrometer.

Figure 3:
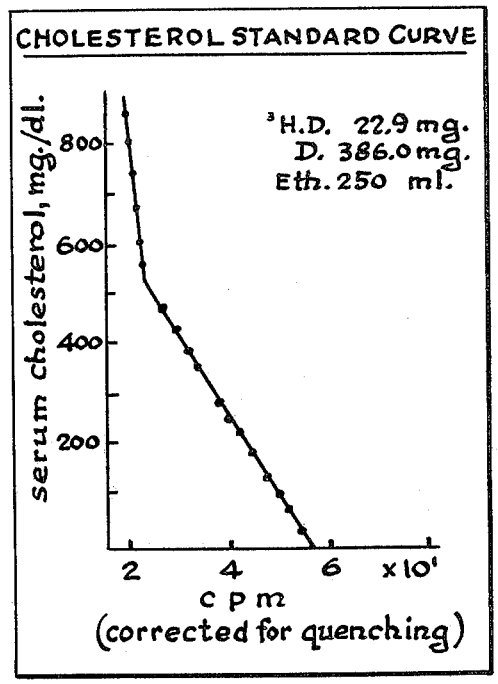
FIGURE 3 is a graph of the standard curve constructed according to the teachings of this invention.

A standard curve is constructed by plotting amount or concentration of cholesterol versus counts per minute in the supernatant portion of each aliquot of the various known cholesterol concentrations prepared. FIGURE 3 of the drawings illustrates a standard curve which was prepared in accordance with the procedure outlined in Example 2 above.

Once the standard curve has been constructed, unknown concentrations of cholesterol of various biological samples may be determined according to this method. If it is desired to determine only free cholesterol concentration, the saponification step is omitted from the process. In this event, the sample is treated with an acetone-alcohol solution to extract the cholesterol; the tritiated digitonin is added thereby precipitating the cholesterol-digitonide complex leaving a supernatant. An aliquot of the supernatant is then added to a portion of scintillator liquid and the counts per minute reading of the supernatant is taken. This reading is then compared on the standard curve and the corresponding cholesterol concentration may be read off of the graph.

Example 3.—Determination of free cholesterol

To 13 ml. of an acetone-alcohol solution in a centrifuge tube is added 1.25 ml. of blood serum and the solution is mixed in a Vortex mixer. The mixture is brought to the boiling point then cooled to room temperature, centrifuged and the extract is decanted into a 25 ml. volumetric flask. The precipitate is washed with 10 ml. of the acetone-alcohol solution, and the combined extract and wash solution is adjusted to a volume of 25 ml. with acetone-alcohol. To a 5 ml. aliquot of this solution, 3 ml. of tritiated digitonin is added, precipitating the cholesterol-digitonide complex. A one-tenth ml. aliquot of the supernatant is added to 15 ml. of scintillator solution and the counts per minute are determined with a liquid scintillation spectrometer.

The counts per minute reading is compared to the standard curve and the cholesterol concentration of the sample is accurately determined.

Example 4.—Determination of total cholesterol

Where a total cholesterol detremination is desired, the procedure of Example 2 is followed in making up the combined extract and wash solution adjusted to a volume of 25 ml. Two 10 ml. aliquots are drawn off, one portion of which is used to determine the free cholesterol content as outlined in Example 2.

To the other 10 ml. aliquot is added 0.2 ml. of 9 N potassium hydroxide and the solution is thoroughly mixed, heated at 45° C. for 45 minutes and then cooled to room temperature. A drop of phenolphthalein in added, and then 10% acetic acid is added dropwise until the solution is colorless after which one more drop of the acid is added.

To a 5 ml. aliquot of the resulting solution, 3 ml. of tritiated digitonin solution is added, after which the volume is adjusted to 8 ml. and mixed. The cholesterol-digitonide complex is allowed to crystallize over night at room temperature. A one-tenth ml. aliquot of the supernatant is added to 15 ml. of scintillation solution and a reading of the counts per minute of the supernatant is taken with the liquid scintillation spectrometer.

The counts per minute reading is compared to the standard curve from which the esterified cholesterol content may be determined. The total of this concentration and the concentration of free cholesterol gives the total cholesterol content.

The method as described in Examples 3 and 4 is shown in FIGURE 2 of the drawings. It now becomes apparent that this technique has a great advantage over the prior art methods since at no point is there the need to separate, extract, purify or in any way handle a precipitate. The possibility of the loss of any cholesterol through serial handling is thereby eliminated rendering cholesterol measurements far more accurate. Of equal significance is the fact that a relatively unskilled technician can utilize this method once he has been taught how to use the equipment. And finally, it can be seen that there is no need to carry any extraction step to the point of actual physical separation. For example, the acetone-alcohol solution may be added to the vial containing the sample, precipitating out the proteinaceous and salt materials and leaving the cholesterol in the supernatant. Tritiated digitonin solution may be added directly to the same vial precipitating the cholesterol-digitonide complex out of solution and an aliquot of the supernatant may easily be withdrawn for assaying in the liquid scintillation spectrometer. If a total cholesterol determination is to be made, the saponification step may be included and the complete method similarly carried out in sequence in the same vial. The practical manifestation of this advantage is that it enables the development of a simplified clinical kit for cholesterol determinations which have been heretofore non-existent, and which may be used by any ordinary laboratory technician.

I claim:
1. A method for determining the cholesterol content of a biological sample by treatment with a solution of isotopic material wherein a standard reference graph has first been constructed by plotting several known concentrations of cholesterol against the radiation readings of the supernatant solution remaining after the cholesterol is precipitated with a known excess of a solution of isotopic material comprising the steps of:
   (a) extracting the cholesterol from the sample with a suitable solvent;
   (b) adding a known excess amount of a solution of a cholesterol-precipitant which has been labelled with a radioactive isotopic material to the extract to precipitate substantially all of the cholesterol leaving a supernatant;
   (c) measuring the radiation level of the supernatant;
   (d) comparing the measured radiation level of the supernatant to the standard reference graph to obtain the cholesterol concentration corresponding to this radiation level.

2. A method according to claim 1 wherein the isotopic material is a member selected from the group consisting of tritiated digitonin, $^{14}$carbon digitonin, $^{131}$iodine digitonin, tritiated tomatidine, $^{14}$carbon tomatidine, $^{131}$iodine tomatidine, tritiated tomatine, $^{14}$carbon tomatine and $^{131}$iodine tomatine.

3. A method according to claim 1 wherein the solution of isotopic material comprises one part of tritiated digitonin and from about 12 to about 20 parts of non-labelled digitonin dissolved in a sufficient amount of ethyl alcohol.

4. A method according to claim 2 wherein the isotopic material is tritiated digitonin.

5. A method for determining the free and esterified cholesterol content of a biological sample by treatment with a solution of isotopic material wherein a standard reference graph has first been constructed by plotting several known concentrations of cholesterol against the radiation readings of the supernatant solution remaining after the cholesterol is precipitated with a known excess of a solution of isotopic material comprising the steps of:
(a) extracting all the cholesterol from the sample with a suitable solvent;
(b) adding a saponifying agent to at least a portion of the extract solution to hydrolyze the esterified cholesterol;
(c) adding a known excess amount of a solution of a cholesterol-precipitant which has been labelled with a radioactive isotopic material to the extract solution to precipitate substantially all of the cholesterol leaving a supernatant;
(d) measuring the radiation level of the supernatant;
(e) comparing the measured radiation level of the supernatant to the standard reference graph to obtain the cholesterol concentration corresponding to this supernatant radiation level.

References Cited

UNITED STATES PATENTS 3,001,950  9/1961  Hopper.

OTHER REFERENCES

McDougal et al., J. Lab. & Clin. Med. 50, No. 3, September 1957, pp. 485–487.

Gershberg et al., J. Lab. & Clin. Med. 27, No. 11, August 1942, pp. 1439–1443.

MORRIS O. WOLK, Primary Examiner

R. M. REESE, Assistant Examiner

U.S. Cl. X.R.

424—1